Patented Feb. 2, 1932

1,843,870

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SYNTHETIC RESIN PRODUCT OF LOW ACIDITY AND PROCESS OF MAKING SAME

No Drawing. Application filed September 23, 1924. Serial No. 739,344.

This invention relates to a synthetic resin and to the process of making same and relates especially to resinous products of a neutral character or of a relatively low degree of acidity.

Synthetic resins made from raw materials which contain acids for example the resinous substances obtained by reacting on glycerol with phthalic acid or anhydride possess a considerable degree of acidity which in some applications is objectionable.

In the present invention it is an object to reduce acidity by treatment of the resinous material or complex with aniline, toluidine, naphthylamine or similar amino or in some cases amido bodies to reduce the acidity preferably to or near the neutral point. Compounds of this character are hereinafter referred to as amines of the aniline type.

The treatment of a whole series of resins of this general character may be carried out advantageously in accordance with the present invention. For example resins which are made from glycerol, glycol, mannitol and the like with phthalic, camphoric, salicylic, benzoic, citric, tartaric, lactic, malic, mucic and other acids or in some cases the corresponding anhydrides may be treated with various amino or amido bodies, preferably the former, to accomplish such a reduction in acidity. Resins of this character are hereinafter referred to as resins of the glycerol organic acid type.

The products obtained from mixed acids including non-resin acids and glycerol likewise may be treated, for example the benzoic phthalic glyceride or the silicylic phthalic glyceride compounds. A product of desirable solubility in the nitrocellulose field is obtained by reacting together phthalic anhydride, glycerol and common rosin. It usually has an acid number ranging from 10 to 20.

In one case rosin phthalic glyceride resin was made by heating 81 pounds window glass rosin, 21 pounds glycerol and approximately 19 pounds phthalic anhydride to a temperature of approximately 290° C. The heating was carried out gradually with agitation. About 112 pounds of resin having an acid number of 10.9 were obtained.

When 100 parts by weight of this resin were heated at 290° C. with 5 parts of para-toluidine the acid number became 4.9 and when 10 parts of toluidine were employed the acid number was zero. In other words a neutral resin was obtained. The temperature employed in reacting on the acid product with the amine may be varied depending on the character of the latter. The reaction may take place at atmospheric pressure or at pressures above or below atmospheric.

This may be employed in making lacquers containing nitrocellulose where the absence of free acid is desirable. Also in some molding compositions employed in hot pressing the absence of free acid is considered advantageous as there is less likelihood of injury to the steel molds.

In another case phthalic glyceride resin having a much higher acid number, which was fusible but which rather readily became converted to an infusible form on heating, was found to have the acid number very materially reduced by heating with amines and at the same time the tendency to polymerize to an infusible mass was avoided. When the object is to produce fusible resins to be used for example as substitutes for shellac in plastic molding compositions the treatment with the amine for example aniline or toluidine is advantageous for two reasons, namely the acid number is reduced and polymerization is avoided if a substantial amount of the amine is present.

While I have described the process particularly in connection with the glycerol organic acid resins I do not wish to be limited to such use. Neither do I wish to be limited by the illustrative example herein given, it being the intent of the applicant to employ the reaction in a general way as a means of obtaining from acid resins products which are of reduced acidity or neutral such that they may be used freely in products sensitive to acids, for example nitrocellulose solutions or in other ways where a high acidity would be disadvantageous.

When the acidity of the resin or complex is so great that the aniline, toluidine or other compound produced interferes with its properties the secondary compound may be removed by suitable purification methods.

In general I prefer to use aromatic amines or those of the aniline type including aniline, toluidine and homologues.

If an excess of the amine, for example aniline, is used that which has not entered into combination may be recovered by distilling with steam.

What I claim is:—

1. The process of reducing the acidity of resinous substances of the glycerol organic carboxylic acid type which comprises heating such resinous substances with an amine.

2. The process of reducing the acidity of resinous substances of the glycerol organic acid type which comprises heating such resinous substances with an aromatic amine.

3. The process of treating rosin phthalic glyceride resin which comprises heating it with an aromatic amine in such manner that a neutral resin is obtained.

4. The process of treating rosin phthalic glyceride resin which comprises heating it with an aromatic amine whereby a resin of reduced acidity is obtained.

5. The process of treating a synthetic resin made from acid materials and containing free organic acid which reacts with an aromatic amine, which comprises heating the product with an aromatic amine whereby a reduction in acidity is secured.

6. In the manufacture of resins of the glycerol polybasic carboxylic acid type the step which comprises reacting on an acid resin of this character with an aromatic amine whereby a reduction in acid number is brought about and polymerization to an infusible product is prevented.

7. The process of improving the properties of resinous substances of the glycerol organic acid type which comprises heating such resinous substances with aniline.

8. The process of reducing the acidity of resins which comprises heating a glycerol organic acid resin with an amine in amount sufficient to reduce the acidity thereof and to prevent substantial polymerization thereof to an infusible mass.

9. The process which comprises heating a resin of the glycerol organic carboxylic acid type with an amine in order to improve the properties thereof, and removing any excess of amine by steam distillation.

10. The process of treating acid resins that react with amines to render them suitable for use in products containing substances sensitive to acids which comprises heating such an acid resin with an amine in order to lower the acidity of the resin.

11. A resinous substance produced from a resin of the glycerol organic acid type and an amine.

12. A neutral resinous substance produced from a glycerol organic carboxylic acid resin and an aromatic amine.

13. A low acidity resinous substance produced from rosin phthalic glycerol resin and an aromatic amine.

14. A resinous complex, non-corrosive to metal, obtained from a resin of the glycerol organic acid type by heating with an aromatic amine.

15. The process of producing resinous complexes of relatively low acid number which comprises subjecting a complex reaction product of a polyhydric alcohol and a polybasic carboxylic acid to the action of an organic, liquid neutralizing substance, and then removing any excess of the neutralizing agent.

16. The process of reducing the acidity of resinous substances of the glycerol organic acid type, which comprises heating said substances with a primary aromatic amine.

17. A resinous product of reduced acidity obtained by treatment of a resin of the glycerol organic acid type with a primary aromatic amine.

18. An amine neutralized polybasic carboxylic acid-polyhydric alcohol resin.

19. A substantially neutral polybasic carboxylic acid-polyhydric alcohol resin.

20. The process of preparing resins which comprises forming a polybasic carboxylic acid-polyhydric alcohol resin of high acidity, and neutralizing such acidity at least in part.

21. A resinous complex obtained from an acid resin that reacts with amines, and an amine.

22. The process of making resinous complexes comprising producing a complex of the polyhydric alcohol-polybase carboxylic acid type of relatively high acid number and capable of being converted into an insoluble product, and treating said complex to reduce its acid number and to reduce its ability of becoming converted into an insoluble product.

23. The process of making resinous complexes comprising producing a complex of the polyhydric alcohol-polybasic carboxylic acid type of relatively high acid number and capable of being converted into an infusible product, and treating said complex to reduce its acid number and to reduce its ability of becoming converted into an infusible product.

24. The process of making resinous complexes comprising producing a complex of the polyhydric alcohol-polybasic carboxylic acid type of relatively high acid number and capable of being converted into an insoluble product, and treating said complex with an amine to reduce its acid number and to reduce its ability of becoming converted into an insoluble product.

25. The process of making resinous complexes comprising producing a complex of the polyhydric alcohol-polybasic carboxylic acid type of relatively high acid number and capable of being converted into an infusible product, and treating said complex with an amine to reduce its acid number and to reduce its ability of becoming converted into an infusible product.

26. The process of making resinous complexes comprising producing a complex of the polyhydric alcohol-polybasic carboxylic acid type of relatively high acid number and capable of being converted into an insoluble product, and treating said complex with an aromatic amine to reduce its acid number and to reduce its ability of becoming converted into an insoluble product.

27. The process of making resinous complexes comprising producing a complex of the polyhydric alcohol-polybasic carboxylic acid type of relatively high acid number and capable of being converted into an infusible product, and treating said complex with an aromatic amine to reduce its acid number and to reduce its ability of becoming converted into an infusible product.

28. A soluble resinous complex of the polyhydric alcohol-polybasic acid type, said complex having an acid number lower than that obtained by direct interreaction of the resinifying ingredients utilized in producing such polyhydric alcohol polybasic acid complex said complex being soluble in nitrocellulose lacquer solvents.

29. An amine reacted resinous complex of the polyhydric alcohol-polybasic acid type, said complex having an acid number lower than that obtained by direct interreaction of the resinifying ingredients utilized in producing such polyhydric alcohol polybasic acid complex.

30. An aromatic amine reacted resinous complex of the polyhydric alcohol-polybasic acid type, said complex having an acid number lower than that obtained by direct interreaction of the resinifying ingredients utilized in producing such polyhydric alcohol polybasic acid complex.

31. A soluble resinous complex of the phthalic glyceride type having an acid number lower than that obtained by direct interreaction of phthalic acid and glycerol said complex being soluble in nitrocellulose lacquer solvents.

32. An amine reacted complex of the phthalic glyceride type having an acid number lower than that obtained by direct interreaction of phthalic anhydride and glycerol.

33. An aromatic amine reacted complex of the phthalic glyceride type having an acid number lower than that obtained by direct interreaction of phthalic anhydride and glycerol.

34. A fusible, resinous complex of the phthalic glyceride type having a monobasic acid bound in the resin molecule, the complex having been formed by simultaneous reaction of the ingredients, said complex having an acid number lower than that obtained by direct interreaction of phthalic acid and glycerol.

35. A soluble resinous complex of the phthalic glyceride type having a fixed monobasic acid bound in the resin molecule, said complex having an acid number lower than that obtained by direct interreaction of phthalic acid and glycerol.

36. A fusible, aromatic amine reacted complex of the phthalic glyceride type having an acid number lower than that obtained by direct interreaction of phthalic anhydride and glycerol.

37. A soluble, aromatic amine reacted complex of the phthalic glyceride type having an acid number lower than that obtained by direct interreaction of phthalic anhydride and glycerol.

38. A soluble resinous complex of the polyhydric alcohol-mixed organic carboxylic acids type, one of said acids being a fixed monobasic organic carboxylic non-resin acid having an acid number lower than that obtained by direct interreaction of the resinifying ingredients utilized in producing such polyhydric alcohol-mixed organic carboxylic acids complex.

39. An aromatic amine reacted complex of the glycerol mixed organic carboxylic acids type having an acid number lower than that obtained by direct interreaction of glycerol and a mixture of organic carboxylic acids.

40. A soluble fusible resinous complex of the polyhydric alcohol, polybasic organic carboxylic acid, non-resin monobasic organic carboxylic acid type adapted for use in coating compositions, said resinous complex having an acid number lower than that obtained by direct interreaction of phthalic anhydride and glycerol to form soluble resins.

CARLETON ELLIS.